United States Patent Office 3,414,588
Patented Dec. 3, 1968

3,414,588
CONDENSATION OF ALDEHYDES WITH
UNSATURATED COMPOUNDS
Daniel G. Jones, Pennington, N.J., assignor to Mobil Oil
Corporation, a corporation of New York
No Drawing. Filed Jan. 29, 1964, Ser. No. 341,094
16 Claims. (Cl. 260—340.7)

ABSTRACT OF THE DISCLOSURE

A process for producing Prins-type condensation products which comprises effecting reaction between an aldehyde, e.g., formaldehyde, and an ethylenically unsaturated compound, e.g., isobutylene, at a temperature from about room temperature to about 400° C. in the presence of a catalyst consisting essentially of a base exchanged crystalline alumino-silicate containing active cation sites within an ordered internal structure, e.g., a rare earth exchanged faujasite.

---

This invention relates to the condensation of aldehydes with unsaturated compounds in the presence of an alumino-silicate having unique catalytic activity and in particular to the production of certain organic compounds by a Prins-type reaction in the presence of such alumino-silicate catalysts.

This invention contemplates effecting Prins-type reactions between aldehydes and certain unsaturated compounds in the presence of a catalyst prepared from naturally occurring or synthetic alumino-silicates having active cation sites within an ordered internal structure. These cation sites are formed by the presence of certain exchangeable metal cations and/or hydrogen ions ionically bonded or chemisorbed within the ordered internal structure of the alumino-silicate; preferably the cations are such that a substantial proportion of the active sites formed within certain alumino-silicates are hydrogen sites. Furthermore, this invention concerns a process for effecting reaction between an aldehyde compound and an ethylenically unsaturated organic compound having an alpha hydrogen adjacent to the ethylenic linkage under condensation conditions in the presence of the heretofore described catalyst.

In particular, this invention is directed to the production of Prins-type condensation products including alcohols (saturated and unsaturated), glycols, conjugated diolefins, alkyl m-dioxanes, and the like, and derivatives thereof, by effecting reaction between formaldehyde and an ethylenically unsaturated organic compound such as vinyl aromatics, olefins, terpenes, alkyl ethers, and the like, in the presence of the aforementioned catalysts.

In accordance with this invention, it has been found that Prins-type reactions can be catalyzed to provide quantitative yields of condensation products under certain reaction conditions in the presence of a base exchanged alumino-silicate which contains certain exchangeable metal cations and/or hydrogen ions within an ordered internal structure.

The unsaturated compounds that may be condensed with aldehydes by the present process include aliphatic, alicyclic, cyclic (including monocyclic, bicyclic and polycyclic compounds) or heterocyclic compounds that have a double bond between two carbon atoms within their molecular moieties. In addition, these ethylenically unsaturated compounds have a hydrogen atom that is bonded alpha to the carbon to carbon ethylenic linkage. Exemplary of these compounds are the olefins i.e. ethylene, propylene, isobutylene, 2-pentene, diisobutylene, trimethylethylene, and the like; the vinyl aromatic compounds such as styrene, vinyl toluene, divinylbenzene, and the like; the terpenes including pinene, d-limonene, camphene, cedrene, myrcene, and the like; diolefins such as butadiene, isoprene, 2,3-dimethyl-butadiene-1,3, and the like, and the heterocyclic compounds such as the furans, thiophenes, pyridines, pyrroles, and the like. In addition, derivatives of these compounds containing substituents such as alkyl, alkoxy, the halogens, cyano, hydroxy, and other like groups may be employed. It will be appreciated that these olefinic-type compounds include primary, secondary and tertiary carbon to carbon linkages and that these compounds may contain from 2 to 20 carbon atoms per molecule.

In general, the aldehydes used by the present process are acyclic compounds that contain from about 1 to about 15 carbon atoms; those containing from 1 to 10 carbon atoms being preferred. In addition, polymers of the aldehydes such as paraformaldehyde (polyoxymethylene) and paraldehyde that will decompose under the reaction conditions of this process to produce the lower molecular weight aldehydes such as formaldehyde, may be used. Exemplary of the suitable reactive aldehydes are formaldehyde, acetaldehyde, propionaldehyde, butyraldehyde, paraformaldehyde and the like; formaldehyde and its polymers being the preferred reactants. It will be appreciated that these aldehydes may be employed in aqueous solutions or with inert organic solvents. For example, one method for introducing formaldehyde into the present process is by the use of formalin, an aqueous solution containing from about 20 to about 50 percent of formaldehyde. Furthermore, it will be also appreciated that the aldehydes may be used either in liquid or gaseous state and that those which are solids at the reaction temperatures are employed in an organic solvent carrier.

In accordance with this invention, it has been found that particularly effective catalysts are prepared from alumino-silicates that contain a high concentration of hydrogen sites within an ordered internal structure. These hydrogen sites are produced by ionically bonding or chemisorbing hydrogen ions within the molecular structure of the alumino-silicate. This bonding or chemisorption may be brought about by base exchange of the alumino-silicate with a fluid medium containing the hydrogen ions; the resulting exchanged product often having an acid character.

Advantageously, the alumino-silicate catalysts having a high concentration of hydrogen sites may be prepared from a variety of naturally occurring and synthetic alumino-silicates. In general, these alumino-silicates have exchangeable metal cations (e.g. alkali metals and alkaline earth metals) that are completely or partially replaced by conventional base exchange with certain other metal cations and/or hydrogen ions.

Some alumino-silicates can be base exchanged directly with hydrogen ions to form the catalyst for this invention. However, other alumino-silicates such as zeolite X, a synthetic faujasite, are suitable to direct base exchange with hydrogen ions, or are ot structurally or thermally stable after a portion of their exchangeable metal cations have been replaced with hydrogen ions. Thus, it is often necessary to exchange other metal cations with these alumino-silicates to achieve the necessary stability within the ordered internal structure prior to the inclusion of the hydrogen ions.

Because of the concentration of hydrogen sites may vary depending on the metal cations and/or hydrogen ions used, the extent of base exchange, as well as the type of alumino-silicate being treated, it may be desirable to measure the concentration of hydrogen ions within the alumino-silicate catalyst. Thus, it has been determined that the alumino-silicates having at least 0.5 milliequivalent of hydrogen per gram of solid, and preferably above about 0.75 milliequivalent of hydrogen per gram of solid, are particularly effective acid catalysts for the purposes of this invention.

It will be appreciated that milliequivalents of hydrogen within the solid catalyst indicates total concentration of hydrogen ions present within the alumino-silicate and that the spatial conecntration of these ions is dependent upon the ordered internal structure of the alumino-silicate being treated. Thus, alumino-silicates containing substantially the same total hydrogen ion concentration may possess different levels of catalytic activity.

It will also be appreciated that the unique activity of the catalyst for promoting the Prins reaction is dependent not only on the concentration of hydrogen ion and/or metal cation sites found within an ordered internal structure but also on the accessibility of the sites for contacting the compounds being reacted.

Because of the unique activity of the alumino-silicate catalyst for effecting the Prins reaction is dependent on the accessibility of the active cation sites, the defined pore size of the alumino-silicate is to be considered when preparing the catalyst of this invention. Generally, the alumino-silicate should have a pore size of at least about 5.9 A. (as evidenced by its ability to sorb at least 4 weight percent of isobutane at 25° C. and 760 mm. pressure of isobutane) so that it can accept the aromatic reactants and also accommodate the formation of branched chain reaction products within an ordered internal structure. Preferably, in order to accommodate the products of the larger molecular weight compounds, especially, the alicyclic and aryl compounds such as terpene, styrene and the like, the pore size is from about 7 A. to about 15 A. in diameter. It will be appreciated that the pore size selected for the alumino-silicate catalyst will depend on the reactants to be employed as well as the configuration of the reaction product that is to be produced.

In addition, the stability and distribution of active cation sites formed within the alumino-silicate is also effected by the silicon to aluminum atomic ratio within its ordered internal structure. In an isomorphic series of crystalline alumino-silicates, the substitution of silicon for aluminum in the rigid framework of the lattice, results in a decrease of total cation sites as evidenced by elemental analysis and reduction of exchanged capacity. Thus, among the faujasite isomorphs the zeolite known as Y will have a sparser distribution of sites within the pores than the zeolite known as X. (These catalysts are hereinafter described in greater detail.) It has been found that alumino-siliactes having a high silicon to aluminum ratio are more desirable for preparing the catalysts of this invention. Preferably, the silicon to aluminum atomic ratio is at least about 1.8. These catalysts are readily treated with solutions that contain hydrogen ions and are readily regenerable after having been used by contact at elevated temperatures wtih an oxygen containing stream at controlled conditions such that the carbonaceous residues may be efficiently removed without damage to the essential structure and properties of the catalyst.

Typical of the alumino-silicates employed as precursors for preparing the catalysts of this invention, are several alumino-silicates, both natural and synthetic, which have a defined pore size of from about 5.9 A. to about 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, ad $y$ the moles of $H_2O$. The cation can be any or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-siliactes, the two main characteristics of these materials is the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

$$1.0\pm0.2m_{2/n}O:Al_2O_3:2.5\pm SiO_2:yH_2O$$

Zeolite X is commercially available in both the sodium and the calcium forms. It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9\pm0.2Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Other alumino-silicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a mixed salt of sodium, calcium and/or potassium. The pure sodium form may be represented by the following formula:

$$Na_8(AlO_2)_8(SiO_2)_{40}.24H_2O$$

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metal catons and/or hydrogen ions within its pore structure so that its catalytic activity may be altered for a particular reaction. Among the naturally occurring crystalline alumino-silicates which can be employed are faujasite, heulandite, clinoptilolite, mordenite and mordenite-like structures, and dachiardite.

Particularly effective alumino-silicate catalysts for this invention are those prepared from the class of zeolites having faujasite-like crystalline structures. One catalyst having a high concentration of hydrogen sites characterized by having a defined pore size of at least about 6 A. in diameter and a high concentration of hydrogen sites within an ordered internal structure, is prepared from the sodium form of zeolite X by a conventional treatment involving partial replacement of the sodium by contact with a fluid medium containing cations of at least one of the rare earth metals. Any medium which will effect ionization without affecting the crystalline structure of the faujasite material may be employed. After such treatment the resulting exchanged product is water washed, dried and dehydrated. The dehydration thereby produces the characteristic system of open pores, passages, or cavities of crystalline alumino-silicate.

As a result of the above treatment, the rare earth exchanged alumino-silicate is an activated crystalline catalyst material in which the molecular structure has been changed by having metallic rare earth cations and hydrogen ions chemisorbed or ionically bonded thereto.

Accordingly, it has been found that a rare earth exchanged zeolite X catalyst that has the unique activity contemplated by this invention may contain from about 0.5 to about 1.0 milliequivalents of hydrogen per gram of solid catalyst. Furthermore, the defined pore size of the rare earth exchanged zeolite X may vary from above 6 A., generally from about 6 A. to about 15 A., and are usually in the approximate range of from about 9 A. to about 10 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–60% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

It will be appreciated that the rare earth exchanged zeolite X may be also base exchanged with a fluid medium containing hydrogen ions or compounds convertible to the hydrogen ions such as ammonium chloride after it has been exchanged with the rare earth metal cations. The resulting rare earth-hydrogen exchanged zeolite X is a particularly effective acid catalyst material, because its concentration of hydrogen sites generally is greater than that of the above described rare earth exchanged zeolite X catalyst material.

It will also be appreciated that cations of polyvalent metals other than the rare earths which have a valence of three or more may be used to replace the exchangeable metal cations from the alumino-silicates to provide other effective catalysts for this process. Typical of these metals are titanium, zirconium, vanadium, chromium, manganese, iron, aluminum and the like polyvalent metal. However, it will be understood that the chemical properties of the metal, i.e. its atomic radius, degree of ionization, hydrolysis constant, and the like, will determine its suitability for exchange with the particular alumino-silicate material. In addition, certain divalent metal cations such as calcium, barium and mangenesium, may be base exchanged together with ammonium salts (i.e. chlorides, sulfates, and the like) to provide an alumino-silicate catalyst having an acid character.

Other effective faujasite type catalysts suitable for this invention may be prepared from zeolite Y. Zeolite Y may be activated to have a high concentration of acid sites by the same base exchange techniques employed for the rare earth exchanged zeolite X catalyst. It has been found that the exchange of rare earth metals for the sodium cations within zeolite Y produces a highly active acid catalyst. However, because zeolite Y has a high acid stability resulting from its high silicon to aluminum ratio, the preferred acid catalyst prepared from this faujasite material is produced by partially replacing the sodium cations directly with hydrogen ions. This replacement may be accomplished by treatment with a fluid medium containing hydrogen ions and/or catons capable of conversion to hydrogen ions. Inorganic and organic acids represent the source of hydrogen ions, whereas ammonium solution such as the chlorides and sulfates, are representative of the fluid media containing cations capable of conversion to hydrogen ions. Accordingly, it will be appreciated that the fluid medium may contain hydrogen ions, ammonium cations, or a mixture thereof, with a pH range from about 1 to about 12.

Mordenite is activated to serve as a catalyst for the instant invention by replacement of its sodium ions with hydrogen ions. The necessary base exchange is essentially the same as that described above for the preparation of acid zeolite Y, except that mineral acids such as HCl are employed as a source of hydrogen ions. In general, the mordenite material is reduced to a fine powder (approximately passing a 200 mesh sieve and preferably passing 300 or 325 mesh sieves or finer) and then acid treated, washed of anions, dried and dehydrated to form the crystalline alumino-silicate structure.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, theoria, titania, boria and combinations of these oxides with one another with other components. Other suitable supports include activated charcoal, mullite, kieselguhr, bauxite, silicon, carbide, sintered alumina and varous clays. These supported crystalline alumino-silicates may be prepared by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–B, and IV–A of the Periodic Table. Such components include for example, silica-alumina, silica-magnesia, silica-zirconia, silica-thoria, silica-berylla, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized therein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of about 1/16" to about 1/8" in diameter, obtained upon pelleting the alumino-silicate with a suitable binder such as clay. The zeolite X, described hereinabove, may be obtained on a clay-free basis or in the form of pellets in which clay is present as a binder.

The reaction temperatures vary with the selection of reactants and catalysts as well as the desired condensation products. In general, temperatures from room temperature to about 400° C. are operative; preferably the reaction temperatures are below about 350° C. The lower temperatures are preferred when m-dioxanes and 1,3-glycols are the desired end products. The higher temperature, i.e. those above about 120° C., are preferred for producing the diolefins and the unsaturated alcohols. Above about 400° C., side reactions such as degradation and polymerization of the unsaturated compounds may reduce the yield of products as well as the activity of the catalyst by the formation of coke-like deposits. Accordingly, it will be appreciated that the choice of a specific reaction temperature will be governed primarily by the Prins-type reaction to be effected and by the activity of the catalyst to be used.

The pressures used by this process may range from about atmospheric to pressures considerably above atmospheric. Oftentimes the pressure is autogenous, i.e. the vapor pressure of the reactants, condensation products and solvents at the reaction temperature of the process.

The amounts of reactants used may be varied over wide limits. In general, the olefinic unsaturated compound is used in greater molar proportions, but a molar ratio of the unsaturated compound to aldehyde from about 0.5 to about 8 may be operative. Usually, the lower molar ratios are required to form the m-dioxanes because of the need for additional aldehydes. Moreover, the order of introducing the reactants, particularly the lower molecular weight primary and secondary olefins, into contact with the catalyst will affect the yield of condensation products. Thus, it has been found that undesirable side reactions, e.g. polymerization of the olefins, can be substantially reduced by first introducing the aldehydes into the reactor vessel so that the catalyst is presaturated prior to the entry of the olefinic compounds.

The Prins-type condensation products formed by the instant process are dependent on the particular reactants, and the nature of the alumino-silicate catalyst as well as the reaction medium and operating conditions employed. For example, it has been found that in the presence of an aqueous medium and a catalyst having a particularly high concentration of acid sites, mixtures of alkyl substituted glycols and alkyl substituted m-dioxanes may be produced from primary or secondary olefinic compounds. By starting with tertiary olefins such as trimethylethylene, formaldehyde condenses to produce a diolefin such as 2,3-dimethyl-1,3-butadiene. Under anhydrous conditions, reaction between tertiary olefins such as isobutylene and formaldehyde forms unsaturated alcohols. Among the compounds that may be produced by this process are the m-dioxanes such as 4-methyl-m-dioxane, 4,4-dimethyl-m-dioxane, 2,4,4,6 - tetramethyl - m - dioxane, 4-phenyl-m-dioxane, 4-vinyl-m-dioxane; glycols such as 1,3-butanediol, 3-methyl-1,3-butanediol, 2,3-dimethyl-1,3-butanediol, 2,3-dimethyl-2,4-pentanediol and the like; conjugated diolefins such as 2,3-dimethyl - 1,3 - butadiene, 1,3-butadiene, isoprene, and the like; unsaturated alcohols such as 2-methyl-1-buten-4-ol, 2-methyl-2-hexen-6-ol, and the like. In addition, other compounds that may also be produced with a Prins-type reaction by this process include methyl ether ketone, tetrahydrofurans or pyrans, adipic dialdehyde, β-propiolactone and the like. Also certain esters of the glycols and alkoxyl acetonitriles may be obtained by the addition of other reactants such as organic acids and hydrogen cyanide to the usual Prins-type reactants.

Because several of the reactants employed, as well as a number of reaction products produced by this process, may be solid or highly volatile and difficult to handle at the desired operating conditions, inert solvent reaction media, as well as aqueous solutions, may be required to effect certain reactions. The inert solvent media are preferably non-volatile and non-reactive under the reaction conditions selected for a particular Prins-type reaction. In general, these solvent media include benzenes, petroleum ethers, ether, halogenated solvents (e.g. chloroform and methylenechloride) methanol, ethanol, acetone and dioxane, and other like solvents. It will be also appreciated that in some cases certain condensation products will be formed in an aqueous medium, while others will be obtained with the use of inert solvents.

The amount of catalyst necessary to effect the Prins reactions of this invention may vary considerably depending on whether the reaction is conducted as a batch-type operation, a continuous, or a semi-continuous process. Generally, during batch-type operation it has been found that the amount of catalyst may extend from about 0.5 percent by weight to about 10 percent by weight of the charge.

In continuous or semi-continuous processes where one or more reactor vessels are employed with cyclic regeneration, the amount of catalyst as measured in terms of the space velocities of the feed charge (mole feed/liter of catalyst/hour) may be in the range from about 10 to about 200. It will be understood that during the cyclic continuous processes or subsequent to their use in batch-type operations, the catalysts of this invention may be readily regenerated by burning the contaminants off in an air stream at temperatures of about 550° C. for from about 1 to about 3 hours.

It will be appreciated that the operating procedures and conditions used by the present process to effect the Prins reactions are dependent upon the specific alumino-silicate catalyst employed and the reactants selected, as well as the solvents used for the reaction media.

Furthermore, conditions such as temperature, pressure, molar ratio between the reactants, time of reaction, the amount of catalyst and the phase relationship within the reaction media, will have significant effects on the resulting reaction products. Accordingly, the manner in which these conditions affect the process of this invention may be more readily understood by reference to the following specific examples.

In the examples, batch-type operations are used to produce the m-dioxanes and 1,3-glycols, while continuous operations are employed for obtaining the unsaturated alcohols and diolefins.

The batch-type operations are conducted in a closed reaction vessel containing particles of the alumino-silicate catalyst and equipped with a stirrer and thermometer. An aqueous formaldehyde solution is charged into the reactor at room temperature and the stirrer is turned on. Then an olefin, e.g. isobutylene and propylene, is introduced into the reactor. The temperature of the vessel is then raised to the reaction temperature. Because the reaction is exothermic, the vessel is heated with an electrical resistance heater which can be controlled to maintain the temperature of the vessel at the desired level. After the reaction is complete as evidenced by a change in the heat generated, the stirrer is stopped. Then the reaction mixture is separated from the catalyst by filtration and the catalyst washed of product with an organic solvent. The resulting organic layer is then dried and fractionated to separate the reaction products. Gas chromatography and infrared techniques are used to analyze the products.

The continuous processes are conducted in a metal pipe reactor (having an inside diameter of approximately 1″) provided with an electrical resistance heating element wrapped around its outer periphery. After the reactor has been loaded with the alumino-silicate catalyst the aldehyde is introduced in an aqueous solution or in an inert solvent medium, depending on the product desired. When the catalyst has become saturated with the aldehyde, the olefinic compound is metered under pressure from a lecture bottle into the reactor. Simultaneously, the temperature of the reactor is raised to the reaction temperature. The reactions are allowed to continue over extended periods of time; and the products are collected and separated in a gas-liquid separator. The liquid product is then fractionated to separate the reaction products and each were analyzed by vapor chromatography.

Example I

Five grams of powdered rare earth exchanged zeolite X catalyst containing 0.5 milliequivalent of hydrogen per gram, are charged into a batch-type reaction vessel. Then 81 grams of an aqueous solution (37 percent) of formaldehyde is introduced into the reactor and a separate stream of 28 grams of isobutylene are metered into the reaction vessel, (equivalent to a 2/1 molar ratio.) The temperature of the reaction vessel is raised to about 250° C. under the autogenous pressure. After 120 minutes the reaction was complete and the products then separated and analyzed. The following yield was obtained:

| | Grams |
|---|---|
| 4,4-dimethyl-m-dioxane | 5 |
| 3-methyl-1,3-butanediol | 7 |
| t-butyl alcohol | 8 |

Example II

Forty-two grams of propylene and 81 grams of formaldehyde in a 37 percent aqueous solution are charged into a reaction vessel containing 5 grams of acid mordenite. Then agitation is started and the contents of the vessel raised to 300° C.; the pressure being autogenous. After 120 minutes the reaction is terminated. Fractionation of the separated liquid products give a 12 percent yield of a 1,3-butanediol (based on formaldehyde). The detailed analysis of the organic product is:

| | Grams |
|---|---|
| 1,3-butanediol | 8.5 |
| Isopropyl alcohol | 22 |
| 4-methyl-m-dioxane | 2.2 |

Example III

Using acid mordenite as the alumino-silicate catalyst with a space velocity of 91 moles feed/liter of catalyst/hour, a feed consisting of 18 percent aqueous formaldehyde solution and isobutylene (the isobutylene/formaldehyde being in a molar ratio of 3.7), was continuously passed into the metal pipe reactor. The reaction temperature was held at 300° C. (at atmospheric pressure.) After 60 minutes on stream, conversion to isoprene was calculated to be about 10 percent based on the formaldehyde chrage.

Example IV

Using hydrogen Y as the crytsalline alumino-silicate and operating procedures of Example V, a mixture of isobutylene and an aqueous solution of formaldehyde at a molar ratio of 3.7 are passed through a pipe reactor with a space velocity of 90 mole feed/liter of catalyst/hour; the reactor being held at a temperature of 300° C. After 60 minutes on stream, a 10 percent conversion of formaldehyde to isoprene is obtained.

Example V

Five grams of ⅟₁₆″ pellets of a rare earth-hydrogen exchanged zeolite X catalyst having 0.5 milliequivalent of hydrogen per gram of solid catalyst are placed in a metal pipe reactor. Then separate streams of isobutylene (5.6 g./hr.) and formaldehyde (3.0 grams) in petroleum ether are fed into the reactor at a molar ratio of 1:1. After 60 minutes on stream at a reaction temperature of 300° C., 1.2 grams of isoprene is obtained.

It will be appreciated from the above examples that the base exchanged alumino-silicate catalysts of this invention readily effect Prins-type reactions between olefinic compounds and aldehydes and that substantially improved yields may be continuously obtained by the present process.

It will also be appreciated that the examples set forth above, as well as the foregoing specification, are merely illustrative of the different olefinic compounds and aldehydes that may be used as reactants for the present process and that other such reactants may be employed in the presence of the alumino-silicate catalyst contemplated by this invention.

It will further be appreciated that base exchanged alumino-silicates having a high concentration of hydrogen sites other than those used in the examples may be employed as catalysts for this process and that various modifications and alterations may be made in the process without departing from the spirit of the invention.

What is claimed is:

1. A process for producing Prins-type condensation products which comprises effecting reaction between an acyclic aldehyde containing from 1 to 15 carbon atoms and an aliphatic monoolefinically unsaturated compound containing from 2 to 10 carbon atoms at a temperature from about room temperature to about 400° C. in the presence of a catalyst consisting essentially of a base exchanged crystalline alumino-silicate containing active cation sites within an ordered internal structure having a defined pore size of from at least about 5.9 A. to about 15 A., said sites being produced by cations selected from a group consisting of the rare earth metals, hydrogen and ammonium.

2. The process of claim 1 in which said unsaturated compound has a hydrogen atom that is bonded alpha to the carbon to carbon ethylenic linkage.

3. The process of claim 1 in which said aldehyde is selected from the group consisting of formaldehyde, acetaldehyde, butyraldehyde, paraformaldehyde, and paraldehyde.

4. The process of claim 1 in which said aldehyde is an aqueous solution of formaldehyde.

5. The process of claim 1 in which said sites are produced by cations of the rare earth metals.

6. The process of claim 1 in which said alumino-silicate has a silicon to aluminum atomic ratio of at least about 1.8 within an ordered internal structure.

7. The process of claim 1 in which said alumino-silicate catalyst is a rare earth exchanged faujasite.

8. The process of claim 1 in which said alumino-silicate catalyst is a rare earth-hydrogen exchanged faujasite.

9. The process of claim 1 in which said alumino-silicate catalyst is an acid mordenite.

10. The proces of claim 1 in which said alumino-silicate catalyst is contained within and distributed throughout a matrix binder.

11. The process of claim 1 in which said reaction takes place in an inert solvent medium.

12. The process of claim 1 in which said reaction is effected at presures from about atmospheric to superatmospheric.

13. A process for producing 4,4-dimethyl-m-dioxane which comprises effecting reaction between formaldehyde and isobutylene in an aqueous reaction medium in the presence of a catalyst consisting essentially of a rare earth exchanged faujasite at a temperature from about 50° C. to about 200° C. and recovering a condensation product of 4,4-dimethyl-m-dioxane.

14. A process for producing 4-methyl-m-dioxane which comprises effecting reaction between formaldehyde and propylene in an aqueous reaction medium in the presence of a catalyst consisting essentially of a rare earth exchanged faujasite at a temperature from about 50° C. to about 200° C. and recovering a condensation product of 4-methyl-m-dioxane.

15. A process for producing 1,3-butanediol which comprises effecting reaction of propylene and formaldehyde in an aqueous reaction medium in the presence of a catalyst consisting essentially of a hydrogen exchanged mordenite at a temperature from about 50° C. to about 400° C., and recovering a condensation product of 1,3-butanediol.

16. A process for producing isoprene which comprises effecting reaction of formaldehyde and isobutylene in an aqueous reaction medium in the presence of a catalyst consisting essentially of hydrogen exchanged mordenite at a temperature from about 100° C. to about 400° C., and recovering a condensation product of isoprene.

References Cited
UNITED STATES PATENTS
3,175,967    3/1965    Miale et al. _____ 260—672

OTHER REFERENCES
Arundale et al.: Chemical Reviews, vol. 51 (1952), pp. 505–517, 528–532.

NICHOLAS S. RIZZO, *Primary Examiner.*

J. H. TURNIPSEED, *Assistant Examiner.*